United States Patent
Park

(10) Patent No.: US 10,628,322 B2
(45) Date of Patent: Apr. 21, 2020

(54) MEMORY SYSTEM AND OPERATING METHOD THEREOF

(71) Applicant: SK hynix Inc., Gyeonggi-do (KR)

(72) Inventor: Jeen Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/052,131

(22) Filed: Aug. 1, 2018

(65) Prior Publication Data

US 2019/0188144 A1    Jun. 20, 2019

(30) Foreign Application Priority Data

Dec. 15, 2017   (KR) .................. 10-2017-0173418

(51) Int. Cl.
   *G06F 12/08*   (2016.01)
   *G06F 12/0893*   (2016.01)

(52) U.S. Cl.
   CPC .. *G06F 12/0893* (2013.01); *G06F 2212/1008* (2013.01)

(58) Field of Classification Search
   CPC ................. G06F 12/0893; G06F 2212/1008
   USPC ........................................... 711/118
   See application file for complete search history.

(56) References Cited

U.S. PATENT DOCUMENTS 10,298,496 B1 *   5/2019   Nakibly ............... H04L 45/742

FOREIGN PATENT DOCUMENTS

| KR | 10-0598907 | 7/2006 |
| KR | 10-2016-0110195 | 9/2016 |
| KR | 101694988 | 1/2017 |
| KR | 10-2014-0093855 | 7/2017 |
| KR | 10-2019-0023292 | 3/2019 |
| KR | 10-2019-0023296 | 3/2019 |

\* cited by examiner

*Primary Examiner* — Hua J Song
(74) *Attorney, Agent, or Firm* — IP & T Group LLP

(57) ABSTRACT

An operating method of a memory system may include: transmitting, by a descriptor generation unit, cache descriptors to a memory interface unit, and suspending the ordered cache output descriptors by ordering cache output descriptors in a response order; generating, by the memory interface unit, cache commands based on the cache descriptors, and transmitting the cache commands to memory devices; transmitting, by the descriptor generation unit, the cache output descriptors to the memory interface unit according to the response order, when the suspensions of the cache output descriptors are released; and generating, by the memory interface unit, cache output commands based on the cache output descriptors, and transmitting the cache output commands to the memory devices.

17 Claims, 9 Drawing Sheets

MEMORY SYSTEM AND OPERATING METHOD THEREOF

CROSS-REFERENCES TO RELATED APPLICATION

The present application claims priority under 35 U.S.C. § 119(a) to Korean application number 10-2017-0173418, filed on Dec. 15, 2017, which is incorporated herein by reference in its entirety.

BACKGROUND

1. Technical Field

Various embodiments generally relate to a memory system, and more particularly, to a memory system including a nonvolatile memory device.

2. Related Art

Memory systems store data provided by an external device in response to a write request. Memory systems may also provide stored data to an external device in response to a read request. Examples of external devices that use memory systems include computers, digital cameras, cellular phones and the like. Memory systems may be embedded in an external device during manufacturing of the external devices or may be fabricated separately and then connected afterwards to an external device.

For meeting continuous consumer demand for improved electronic devices improved memory devices need to be developed.

SUMMARY

In an embodiment, an operating method of a memory system may include: transmitting, by a descriptor generation unit, cache descriptors to a memory interface unit, and suspending the ordered cache output descriptors by ordering cache output descriptors in a response order; generating, by the memory interface unit, cache commands based on the cache descriptors, and transmitting the cache commands to memory devices; transmitting, by the descriptor generation unit, the cache output descriptors to the memory interface unit according to the response order, when the suspensions of the cache output descriptors are released; and generating, by the memory interface unit, cache output commands based on the cache output descriptors, and transmitting the cache output commands to the memory devices.

In an embodiment, a memory system may include: a plurality of memory devices; a descriptor generation unit configured to generate cache descriptors and cache output descriptors, and suspend the ordered cache output descriptors by ordering the cache output descriptors in a response order; and a memory interface unit configured to generate cache commands based on the cache descriptors, and transmit the cache commands to the memory devices, wherein the descriptor generation unit transmits the cache output descriptors to the memory interface unit according to the response order, when the suspensions of the cache output descriptors are released, and the memory interface unit generates cache output commands based on the cache output descriptors, and transmits the cache output commands to the memory devices.

In an embodiment, a memory system may include: a plurality of memory devices each including a memory region and a buffer region; and a controller suitable for controlling, in response to an external request, each of the memory devices to perform operations of buffering into the buffer region data read from the memory region, wherein the controller controls the memory devices to provide thereto the buffered data according to an order defined in the external request.

These and other features and advantages of the present invention will become apparent to those with ordinary skill in the art to which the present invention belongs from the following description in conjunction with the accompanying drawings.

DETAILED DESCRIPTION

Figure 1:
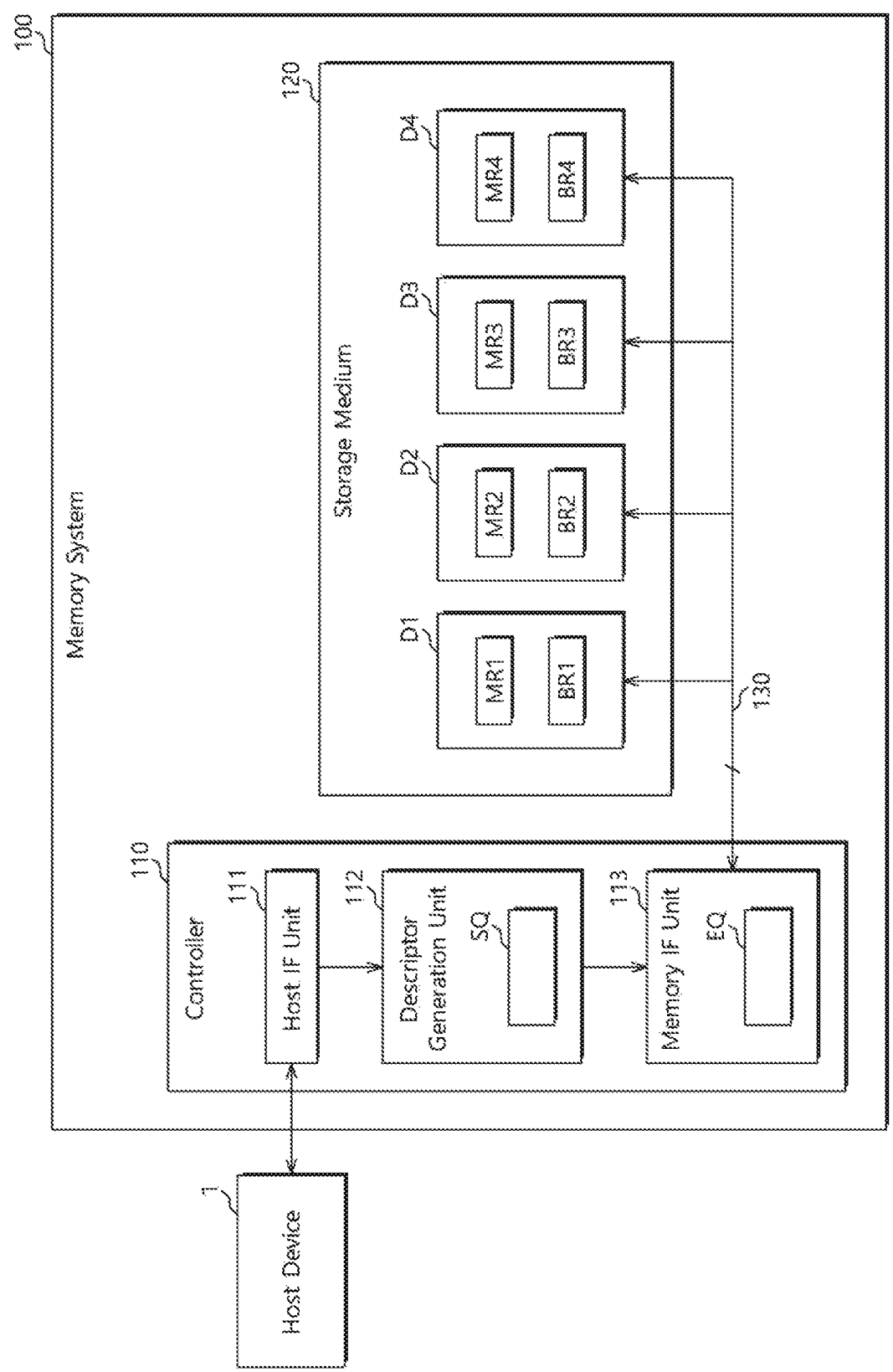
FIG. 1 is a block diagram illustrating a memory system in accordance with an embodiment.

Hereinafter, a memory system and an operating method thereof according to the present invention will be described with reference to the accompanying drawings through exemplary embodiments of the present invention. The present invention may, however, be embodied in different forms and should not be construed as being limited to the embodiments set forth herein. Rather, these embodiments are provided to describe the present invention in detail to the extent that a person skilled in the art to which the invention pertains can enforce the technical concepts of the present invention.

It is to be understood that embodiments of the present invention are not limited to the particulars shown in the drawings, that the drawings are not necessarily to scale, and, in some instances, proportions may have been exaggerated in order to more clearly depict certain features of the invention. While particular terminology is used, it is to be appreciated that the terminology used is for describing particular embodiments only and is not intended to limit the scope of the present invention.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The phrase "at least one of . . . and . . . ," when used herein with a list of items, means a single item from the list or any combination of items in the list. For example, "at least one of A, B, and C" means, only A, or only B, or only C, or any combination of A, B, and C.

The term "or" as used herein means either one of two or more alternatives but not both nor any combinations thereof.

As used herein, singular forms are intended to include the plural forms as well, unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, an element also referred to as a feature described in connection with one embodiment may be used singly or in combination with other elements of another embodiment, unless specifically indicated otherwise.

Hereinafter, the various embodiments of the present invention will be described in detail with reference to the attached drawings.

FIG. 1 is a block diagram illustrating a memory system 100 in accordance with an embodiment.

The memory system 100 may be configured to store data provided from an external host device 1, in response to a write request of the host device 1. Furthermore, the memory system 100 may be configured to provide data stored therein to the host device 1, in response to a read request of the host device 1.

The memory system 100 may include a Personal Computer Memory Card International Association (PCMCIA) card, a Compact Flash (CF) card, a smart media card, a memory stick, various multimedia cards (MMC, eMMC, RS-MMC, and MMC-Micro), various secure digital cards (SD, Mini-SD, and Micro-SD), a Universal Flash Storage (UFS), a Solid-state Drive (SSD) and the like.

The memory system 100 may include a controller 110 and a storage medium 120.

The controller 110 may control overall operations of the memory system 100. The controller 110 may access the storage medium 120 to process write and read requests of the host device 1. Furthermore, the controller 110 may access the storage medium 120 to perform an internal management operation or background operation of the memory system 100, regardless of a request of the host device 1.

The controller 110 may include a host interface unit 111, a descriptor generation unit 112 and a memory interface unit 113.

The host interface unit 111 may receive a request from the host device 1, and transmit the request to the descriptor generation unit 112. The host interface unit 111 may receive data to store in the storage medium 120 from the host device 1, and transmit data read from the storage medium 120 to the host device 1.

The descriptor generation unit 112 may generate a descriptor. The descriptor may include a description about a command which is to be transmitted to a nonvolatile memory device. The descriptor generation unit 112 may generate a descriptor in order to perform a foreground operation in response to a request of the host device 1 or to perform a background operation. The descriptor generation unit 112 may transmit the generated descriptor to a memory interface unit 113 or suspend the generated descriptor in a suspension queue SQ.

For example, the descriptor generation unit 112 may generate a cache descriptor and a cache output descriptor, for a read access. The descriptor generation unit 112 may transmit the cache descriptor to the memory interface unit 113 and suspend the cache output descriptor in the suspension queue SQ.

The descriptor generation unit 112 may include the suspension queue SQ. The descriptor generation unit 112 may suspend in the suspension queue SQ a descriptor which will not yet be transmitted to the memory interface unit 113. The descriptor suspended in the suspension queue SQ may be transmitted to the memory interface unit 113 after the suspension of the descriptor is released according to a predetermined condition. In accordance with the present embodiment, the descriptor suspended in the suspension queue SQ may be transmitted to the memory interface unit 113 according to a response order, even after the suspension is released according to the predetermined condition. This configuration will be described in more detail after.

In another embodiment, the suspension queue SQ may be separately provided outside the descriptor generation unit 112.

The memory interface unit 113 may execute the descriptor transmitted from the descriptor generation unit 112. The descriptor may be queued in an execution queue EQ before the descriptor is executed. The memory interface unit 113 may generate a command based on the descriptor queued in the execution queue EQ, and transmit the command to a target memory device of the storage medium 120 to execute the descriptor.

For example, for a read access, the memory interface unit 113 may generate a cache command based on a cache descriptor, and transmit the cache command to the target memory device to execute the cache descriptor. Furthermore, the memory interface unit 113 may generate a cache output command based on a cache output descriptor, and transmit the cache output command to the target memory device to execute the cache output descriptor.

The execution queue EQ may include a plurality of sub-queues (not illustrated) respectively corresponding to first to fourth memory devices D1 to D4 included in the storage medium 120. Each of the sub-queues may store one or more descriptors related to the corresponding memory device. The memory interface unit 113 may sequentially execute the descriptors queued in the respective sub-queues for the corresponding memory devices. The memory interface unit 113 may execute a descriptor depending on the state of the corresponding memory device or when the corresponding memory device can receive a command. For example, when the memory device is in an idle state, the memory device can receive a command. The memory interface unit 113 may process the descriptors on the entire storage medium 120 according to an order different from the order in which the descriptors are received. Depending on the states of the corresponding memory devices, the memory interface unit 113 may execute a subsequently transmitted descriptor before executing the previously transmitted descriptor.

In another embodiment, the execution queue EQ may be separately provided outside the memory interface unit 113. In this case, the descriptor generation unit 112 may queue a descriptor in the external execution queue EQ, and control the memory interface unit 113 to refer to the descriptor queued in the external execution queue EQ. In the following descriptions, an operation of the descriptor generation unit 112 to transmit a descriptor to the memory interface unit 113 may indicate an operation of queueing a descriptor in the external execution queue EQ and controlling the memory interface unit 113 to refer to the descriptor.

Figure 2:
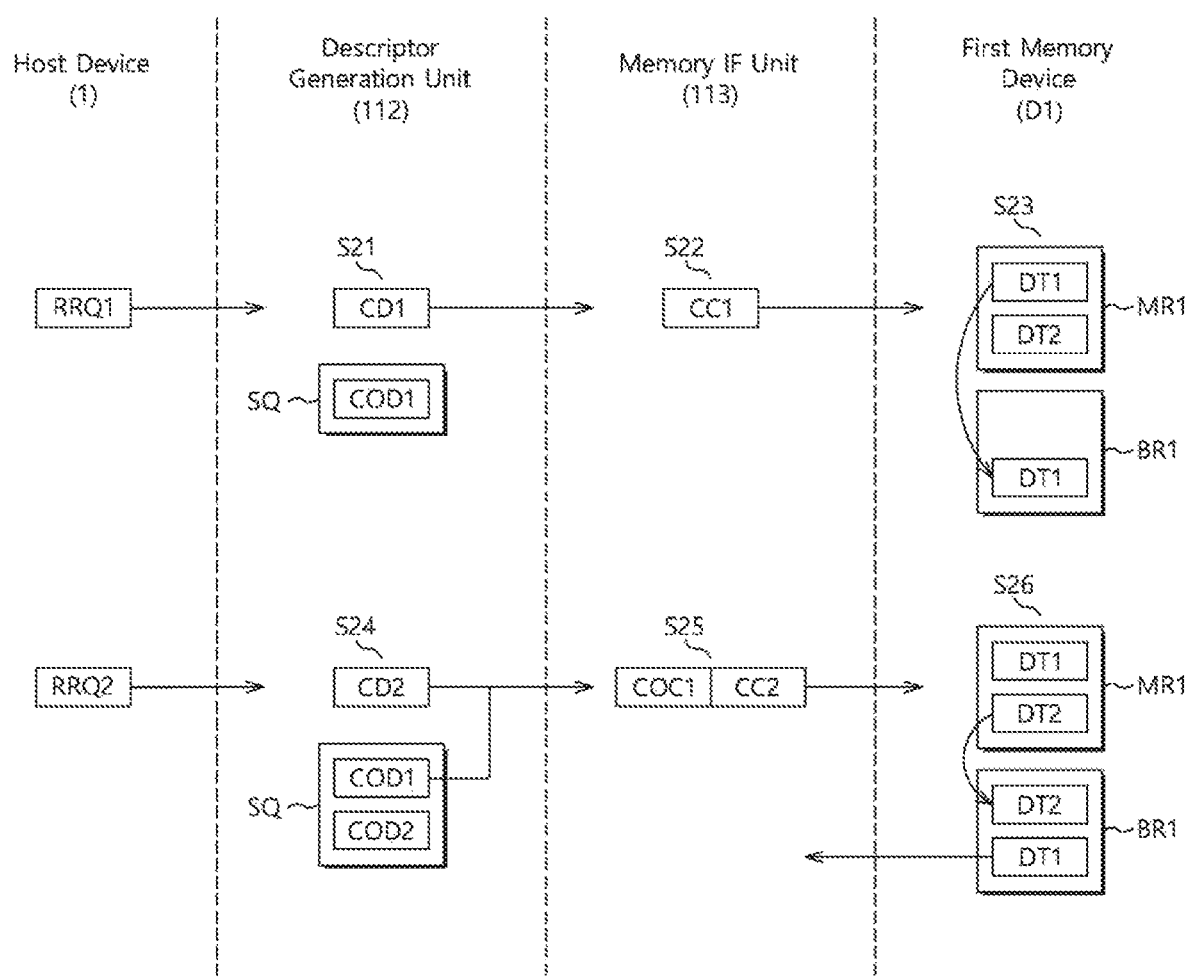
FIG. 2 illustrates a method in which a controller performs successive read accesses on a first memory device in accordance with an embodiment.

FIG. 2 illustrates a method in which the controller 110 performs consecutive read accesses on the first memory device D1 in accordance with an embodiment.

The controller 110 may read-access the first memory device D1 according to a read request of the host device 1. In another embodiment, the controller 110 may read-access the first memory device D1 to process a background operation. In particular, the controller 110 may partially overlap operations of consecutive first and second read accesses, thereby shortening the total performance time of the read accesses.

Specifically, referring to FIG. 2, the descriptor generation unit 112 may generate a first cache descriptor CD1 and a first cache output descriptor COD1 for a first read access based on a first read request RRQ1 of the host device 1, at step S21. The descriptor generation unit 112 may transmit the first cache descriptor CD1 to the memory interface unit 113 and suspend the first cache output descriptor COD1 in the suspension queue SQ.

At step S22, the memory interface unit 113 may generate a first cache command CC1 based on the first cache descriptor CD1, and transmit the first cache command CC1 to the first memory device D1. The memory interface unit 113 may transmit the first cache command CC1 to the first memory device D1 depending on the state of the first memory device D1.

At step S23, the first memory device D1 may cache first data DT1 stored in a main region MR1 into a buffer region BR1 in response to the first cache command CC1. In this case, as the first cache output descriptor COD1 is not yet provided but suspended in the suspension queue SQ at step S21, the first data DT1 may not be outputted, but cached in the buffer region BR1.

At step S24, the descriptor generation unit 112 may generate a second cache descriptor CD2 and a second cache output descriptor COD2 for a second read access based on a second read request RRQ2 of the host device 1. The descriptor generation unit 112 may transmit the second cache descriptor CD2 and the first cache output descriptor COD1 to the memory interface unit 113, and suspend the second cache output descriptor COD2 in the suspension queue SQ.

Step S24 may be performed at the same time as step S22 or S23.

At step S25, the memory interface unit 113 may generate a second cache command CC2 and a first cache output command COC1 based on the second cache descriptor CD2 and the first cache output descriptor COD1, and transmit the second cache command CC2 and the first cache output command COC1 to the first memory device D1. The memory interface unit 113 may transmit the second cache command CC2 and the first cache output command COC1 to the first memory device D1 depending on the state of the first memory device D1.

At step S26, the first memory device D1 may output the first data DT1 cached in the buffer region BR1 to the memory interface unit 113 in response to the first cache output command COC1, while caching second data DT2 stored in the main region MR1 into the buffer region BR1 in response to the second cache command CC2. Therefore, as the cache operation of the second data DT2 and the cache output operation of the first data DT1 overlap each other, the total performance time of the first and second read accesses can be shortened.

Figure 3:
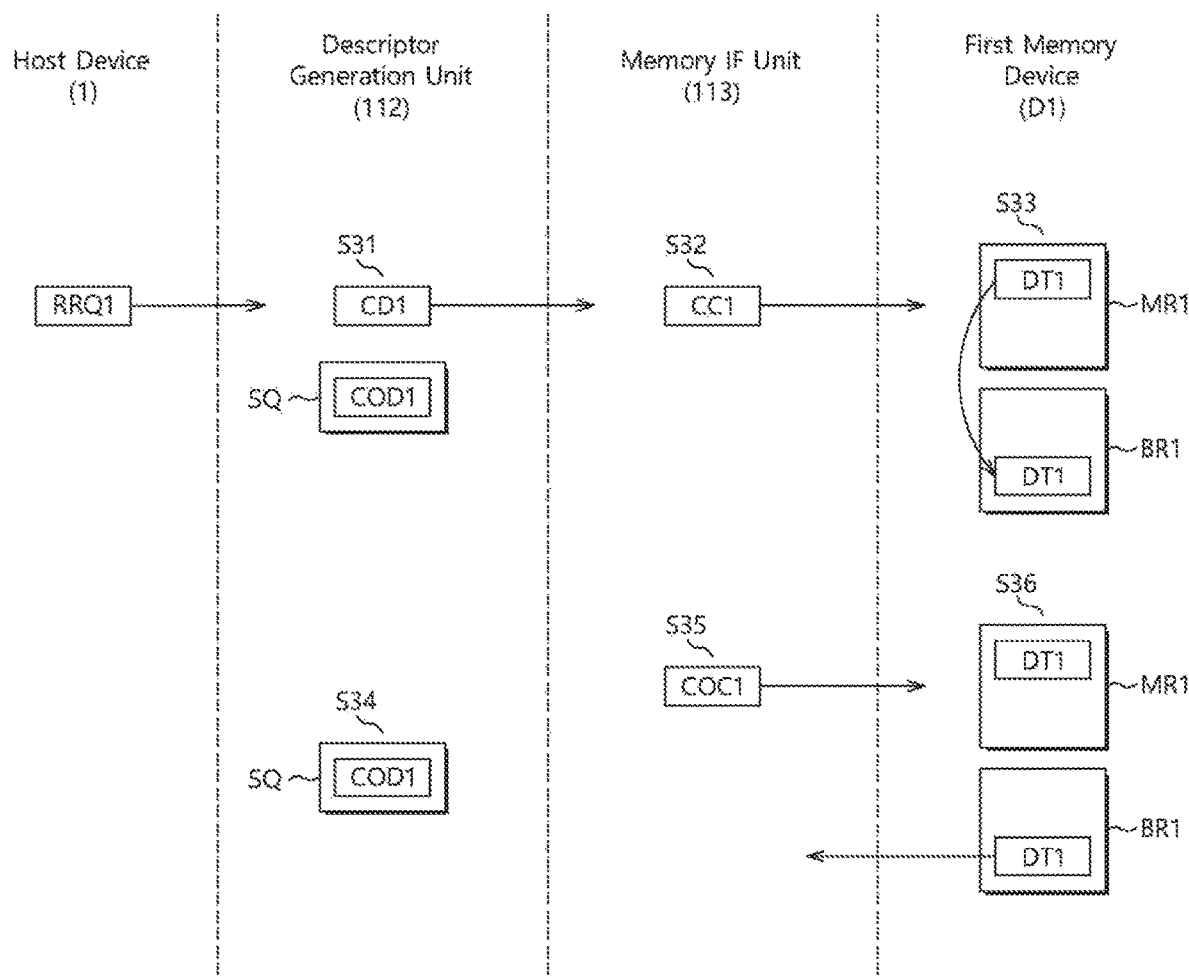
FIG. 3 illustrates a method in which the controller completes a first read access when there is no subsequent second read access, in accordance with an embodiment.

FIG. 3 illustrates a method in which the controller 110 completes a first read access when there is no subsequent second read access, in accordance with an embodiment.

Referring to FIG. 3, a procedure from step S31 to step S33 may be performed in the same manner as the procedure from step S21 to step S23 in FIG. 2.

At step S34, the descriptor generation unit 112 may determine that a suspension-release condition of the first cache output descriptor COD1 is satisfied. The suspension-release condition may be satisfied when it is determined that there is no subsequent read access to the first memory device D1 for a predetermined time. The descriptor generation unit 112 may transmit the first cache output descriptor COD1 to the memory interface unit 113.

At step S35, the memory interface unit 113 may generate a first cache output command COC1 based on the first cache output descriptor COD1, and transmit the first cache output command COC1 to the first memory device D1.

At step S36, the first memory device D1 may output the first data DT1 cached in the buffer region BR1 to the memory interface unit 113 in response to the first cache output command COC1.

As a result, the descriptor generation unit 112 may release the suspension of the first cache output descriptor COD1 at step S34, thereby preventing a delay of the completion of the first read access.

Referring back to FIG. 1, the storage medium 120 may include the first to fourth memory devices D1 to D4. The first to fourth memory devices D1 to D4 may share signal transmission lines 130 coupled to the controller 110. Therefore, the first to fourth memory devices D1 to D4 cannot output data to the controller 110 through the signal transmission lines 130 at the same time, but sequentially output the data.

Hereafter, the configuration and operating method of the first memory device D1 will be described. The second to fourth memory devices may be configured and operated in a similar manner to the first memory device D1.

The first memory device D1 may include the main region MR1 and the buffer region BR1.

The main region MR1 may indicate a region in which data are substantially stored. Although not illustrated, the main region MR1 may include a plurality of memory cells. Each of the memory cells may store one or more data bits.

The buffer region BR1 may indicate a region in which data transmitted from the memory interface unit 113 so as to be stored in the main region MR1 or data read from the main region MR1 so as to be outputted to the memory interface unit 113 are temporarily stored.

The first memory device D1 may perform a cache operation in response to a cache command transmitted from the memory interface unit 113. During the cache operation, the first memory device D1 may read data stored in the main region MR1, and cache the read data into the buffer region BR1.

The first memory device D1 may perform a cache output operation in response to a cache output command transmitted from the memory interface unit 113. During the cache output operation, the first memory device D1 may output the data cached in the buffer region BR1 to the memory interface unit 113.

The first memory device D1 may perform the cache operation and the cache output operation at the same time, when the cache command and the cache output command are transmitted at the same time. That is, the first memory device D1 may output the data cached in the buffer region BR1 to the memory interface unit 113 in response to the cache output command while caching the data stored in the main region MR1 into the buffer region BR1 in response to the cache command provided along with the cache output command.

The nonvolatile memory device may include a flash memory, such as a NAND flash or a NOR flash, a Ferroelectrics Random Access Memory (FeRAM), a Phase-Change Random Access Memory (PCRAM), a Magnetoresistive Random Access Memory (MRAM), a Resistive Random Access Memory (ReRAM), and the like.

FIG. 1 illustrates that the storage medium 120 includes the first to fourth memory devices D1 to D4, but the number of memory devices included in the storage medium 120 is not limited thereto.

Suppose that data are cached in the first to fourth memory devices D1 to D4, and there is no subsequent read access to the first to fourth memory devices D1 to D4. In this state, cache output descriptors for the first to fourth memory devices D1 to D4 may be suspended.

Furthermore, suppose that the first to fourth memory device D1 to D4 have a response order. The response order may indicate an order in which the data buffered in the first to fourth memory device D1 to D4 are to be transmitted to the host device 1. For example, when the host device 1 assigns the response order in order to receive read data as a response from the first memory devices D1 to D4, the host interface unit 111 needs to transmit the data to the host device 1 according to the response order.

In such a situation, the suspension release condition may be satisfied for the first to fourth memory devices D1 to D4. The suspensions of the cache output descriptors for the first to fourth memory devices D1 to D4 may be released regardless of the response order. As the suspended cache output descriptors for the first to fourth memory devices D1 to D4 are processed regardless of the response order, the first to fourth memory devices D1 to D4 may output the cached data to the memory interface unit 113.

The substantial order that the data outputted from the first to fourth memory devices D1 to D4 may be irrelevant to the response order. Therefore, when data has a low priority in the response order even though the data was transmitted early, the data may have to wait until data having a high priority in the response order is transmitted to the host device 1. Therefore, a response delay to the host device 1 may occur.

In accordance with the present embodiment, when the suspensions of the cache output descriptors for the first to fourth memory devices D1 to D4 are released from the suspension queue SQ, the cache output descriptors may be processed according to the response order. That is, although the suspension of a cache output descriptor is released earlier, the cache output descriptor may be transmitted to the memory interface unit 113 according to the response order.

Therefore, although the memory interface unit 113 transmits the cache output commands to the first to fourth memory devices D1 to D4 based on only the states of the first to fourth memory devices D1 to D4, the transmission order of the cache output commands may be arranged according to the response order. As a result, the memory interface unit 113 may receive data from the first to fourth memory devices D1 to D4 according to the response order.

Figure 4:
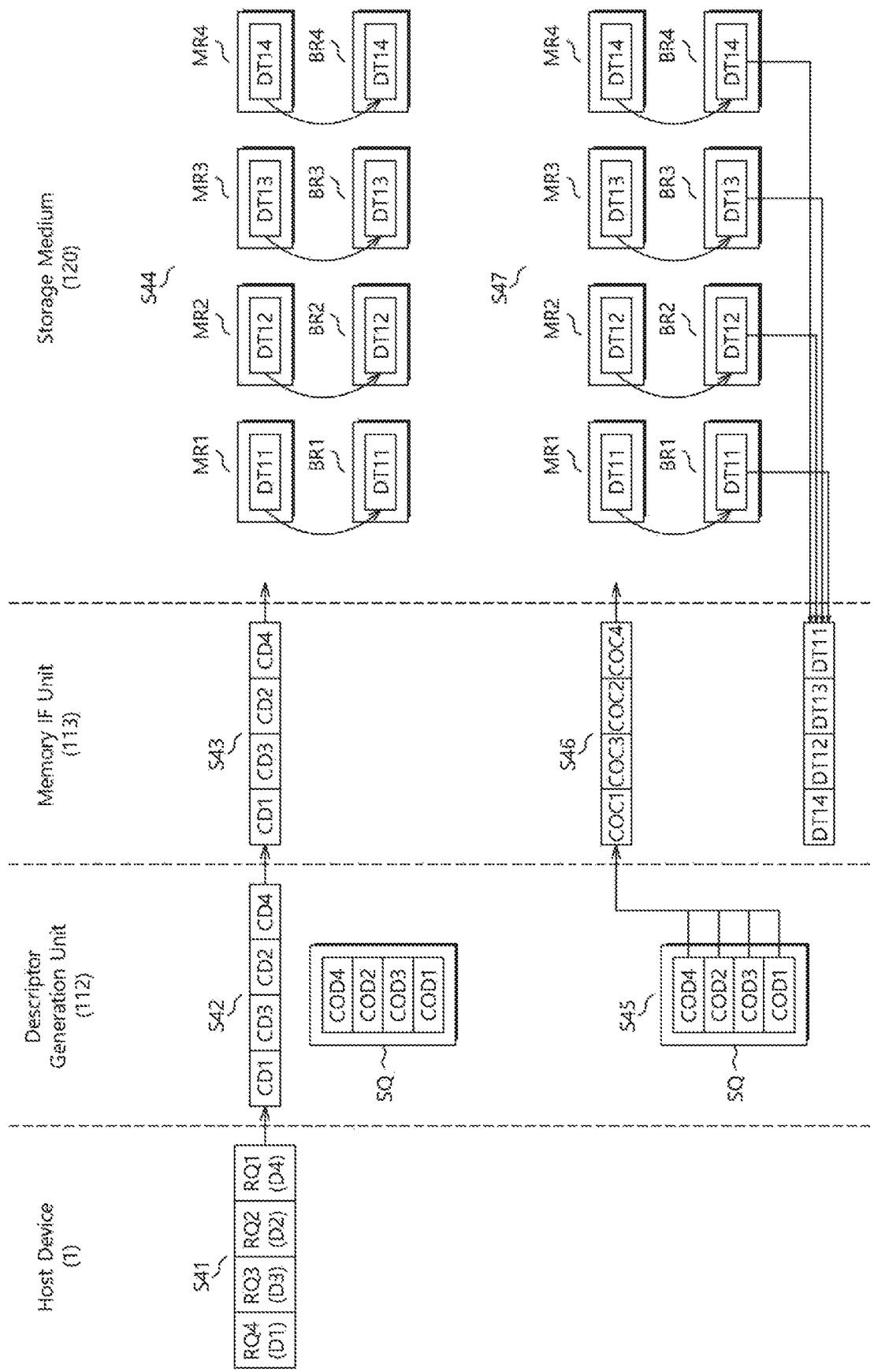
FIG. 4 is a flowchart illustrating an operating method of a memory system in accordance with an embodiment.

FIG. 4 illustrates an operating method of the memory system 100 of FIG. 1 in accordance with an embodiment. FIG. 4 illustrates a method for processing suspended cache output descriptors COD1 to COD4 on the first to fourth memory devices D1 to D4, when there are no subsequent read accesses to the first to fourth memory devices D1 to D4.

Referring to FIG. 4, read requests RQ1 to RQ4 to which a predetermined response order is assigned may be transmitted from the first host device 1 at step S41. The response order may correspond to an order of the fourth memory device D4, the second memory device D2, the third memory device D3 and the first memory device D1, for example. In other words, data read from the fourth memory device D4 need to be first transmitted to the first host device 1, and data read from the first memory device D1 need to be finally transmitted to the host device 1.

At step S42, the descriptor generation unit 112 may generate cache descriptors CD1 to CD4 and cache output descriptors COD1 to COD4 based on the read requests RQ to RQ4. The descriptor generation unit 112 may transmit the cache descriptors CD1 to CD4 to the memory interface unit 113 according to the response order. That is, the descriptor generation unit 112 may first transmit the cache descriptor CD4 for the fourth memory device D4, and finally transmit the cache descriptor CD1 for the first memory device D1. The descriptor generation unit 112 may arrange the cache output descriptors COD1 to COD4 according to the response order, and suspend the ordered cache output descriptors COD1 to COD4 in the suspension queue SQ. The suspension queue SQ may be implemented according to the first-in-first-out (FIFO) scheme.

At step S43, the memory interface unit 113 may generate cache commands CC1 to CC4 based on the cache descriptors CD1 to CD4, and transmit the cache commands CC1 to CC4 to the first to fourth memory devices D1 to D4. The memory interface unit 113 may transmit the cache commands CC1 to CC4 to the first to fourth memory devices D1 to D4, respectively, based on the states of the first to fourth memory devices D1 to D4.

At step S44, the first to fourth memory devices D1 to D4 may perform cache operations in response to the cache commands CC1 to CC4. The first to fourth memory devices D1 to D4 may perform the cache operations by reading data DT11 to DT14 stored in the main regions MR1 to MR4 and caching the read data DT11 to DT14 into the buffer regions BR1 to BR4.

At step S45, the descriptor generation unit 112 may determine that the suspension-release conditions of the cache output descriptors COD1 to COD4 are satisfied. The descriptor generation unit 112 may transmit the suspension-released cache output descriptor COD1 to COD4 to the memory interface unit 113 according to the response order. For example, although the suspension of the cache output descriptor COD2 for the second memory device D2 is released earlier, the cache output descriptor COD2 cannot be transmitted to the memory interface unit 113 until the cache output descriptor COD4 for the fourth memory device D4 is released from the suspension queue SQ and transmitted to the memory interface unit 113.

At step S46, the memory interface unit 113 may generate cache output commands COC1 to COC4 based on the cache output descriptors COD1 to COD4, and transmit the cache output commands COC1 to COC4 to the first to fourth memory devices D1 to D4. The memory interface unit 113 may transmit the cache output commands COC1 to COC4 to the first to fourth memory devices D1 to D4, respectively, based on the states of the first to fourth memory devices D1 to D4. Nonetheless, since the cache output descriptors COD1 to COD4 were transmitted to the memory interface unit 113 according to the response order, the cache output commands COC1 to COC4 may also be transmitted to the first to fourth memory devices D1 to D4 according to the response order. That is, the memory interface unit 113 may first transmit the cache output command COC4 to the fourth memory device D4, and finally transmit the cache output command COC1 to the first memory device D1.

At step S47, the first to fourth memory devices D1 to D4 may output the data DT11 to DT14 cached in the buffer regions BR1 to BR4 to the memory interface unit 113 according to the order in which the cache output commands COC1 to COC4 are received. When receiving the cache output commands COC1 to COC4 in the response order, the first to fourth memory devices D1 to D4 may output the data DT11 to DT14 cached in the buffer regions BR1 to BR4 to the memory interface unit 113 according to the response order.

Figure 5:
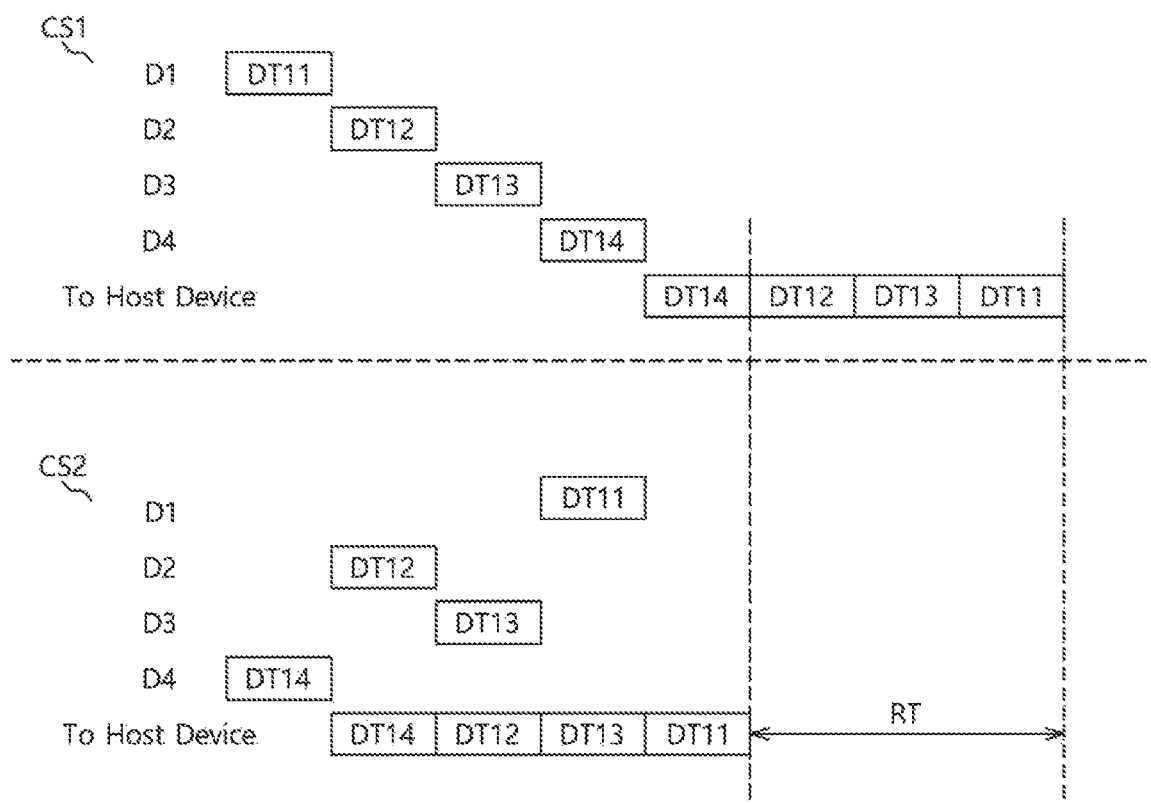
FIG. 5 illustrates an effect of an operating method of the memory system in accordance with an embodiment.

FIG. 5 illustrates the effect of the operating method of the memory system 100 in accordance with an embodiment of the present invention.

Referring to FIG. 5, a first situation CS1 may indicate that the data DT11 to DT14 cached in the first to fourth memory devices D1 to D4 are outputted to the memory interface unit 113 regardless of the response order described with reference to FIG. 4. For example, the data DT11 to DT14 may be outputted to the memory interface unit 113 in an order from the first memory device D1 to the fourth memory device D4.

However, since the data DT11 to DT14 need to be transmitted to the host device 1 according to the response order, the data DT11 to DT13 outputted before the data DT14 cannot be transmitted to the host device 1, until the data DT14 outputted from the fourth memory device D4 is transmitted to the host device 1. The data DT11 to DT13 may be transmitted to the host device 1 after the data DT4 is outputted to the memory interface unit 113 according to the response order.

Unlike the first situation, a second situation CS2 may indicate that the data DT11 to DT14 cached in the first to fourth memory devices D1 to D4 are outputted to the memory interface unit 113 according to the response order. As described above with reference to FIG. 4, the suspension-released cache output descriptors COD1 to COD4 may be transmitted to the memory interface unit 113 according to the response order, such that the cache output commands COC1 to COC4 are transmitted to the first to fourth memory devices D1 to D4 according to the response order. As a result, the data DT11 to DT14 can be immediately transmitted to the host device 1 according to the response order. The response latency for the read requests RQ1 to RQ4 can be reduced by a time RT, compared to the first situation CS1.

Figure 6:
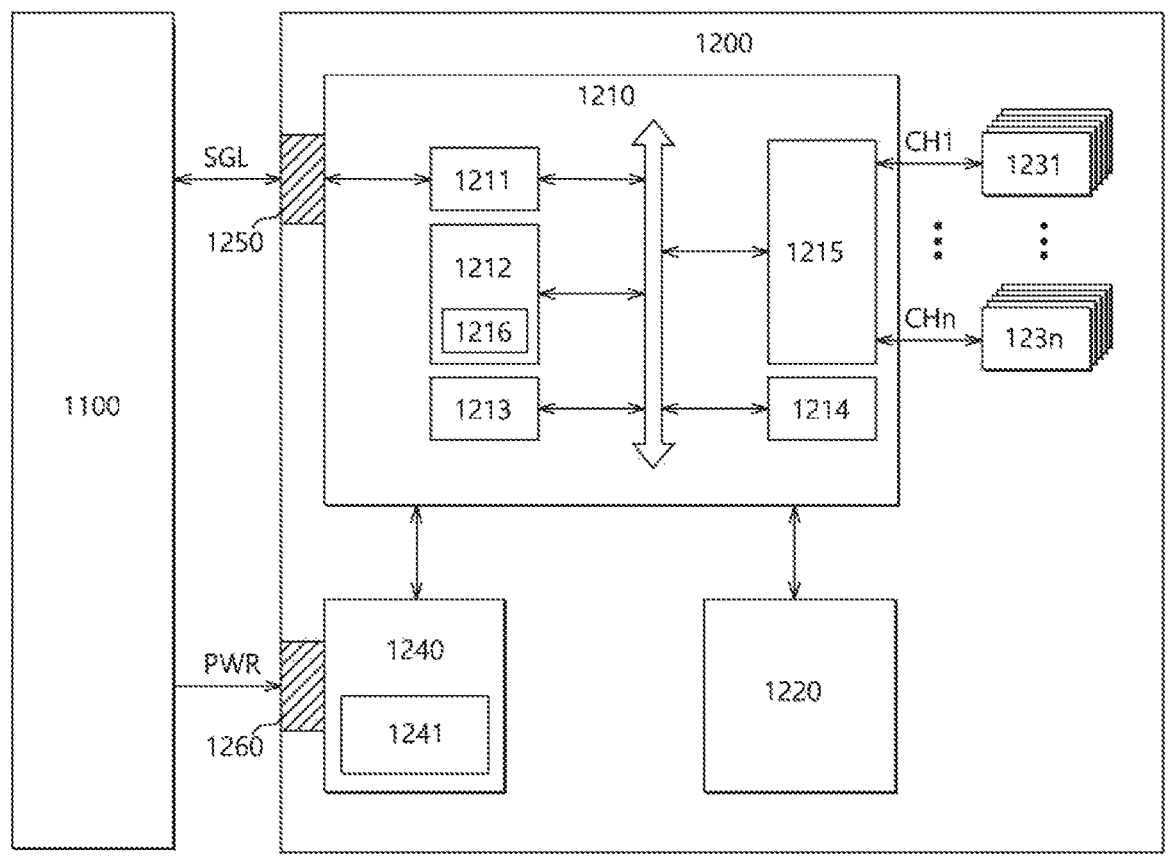
FIG. 6 is a diagram illustrating a data processing system including a solid-state drive (SSD) in accordance with an embodiment.

FIG. 6 is a diagram illustrating a data processing system 1000 including a solid-state drive (SSD) 1200 in accordance with an embodiment of the present invention. Referring to FIG. 6, the data processing system 1000 may include a host device 1100 and the SSD 1200.

The SSD 1200 may include a controller 1210, a buffer memory device 1220, a plurality of nonvolatile memory devices 1231 to 123$n$, a power supply 1240, a signal connector 1250, and a power connector 1260.

The controller 1210 may control general operations of the SSD 1200. The controller 1210 may include a host interface unit 1211, a control unit 1212, a random access memory 1213, an error correction code (ECC) unit 1214, and a memory interface unit 1215.

The host interface unit 1211 may exchange a signal SGL with the host device 1100 through the signal connector 1250. The signal SGL may include a command, an address, data, and so forth. The host interface unit 1211 may interface the host device 1100 and the SSD 1200 according to the protocol of the host device 1100. For example, the host interface unit 1211 may communicate with the host device 1100 through any one of standard interface protocols such as secure digital, universal serial bus (USB), multimedia card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnection (PCI), PCI express (PCI-E) and universal flash storage (UFS).

The host interface unit 1211 may include the host interface unit 111 shown in FIG. 1.

The control unit 1212 may analyze and process the signal SGL received from the host device 1100. The control unit 1212 may control operations of internal function blocks according to a firmware or a software for driving the SSD 1200. The random access memory 1213 may be used as a working memory for driving such a firmware or software.

The control unit 1212 may include a descriptor generation unit 1216. The descriptor generation unit 1216 may include the descriptor generation unit 112 shown in FIG. 1.

The ECC unit 1214 may generate the parity data of data to be transmitted to at least one of the nonvolatile memory devices 1231 to 123$n$. The generated parity data may be stored together with the data in the nonvolatile memory devices 1231 to 123$n$. The ECC unit 1214 may detect an error of the data read from at least one of the nonvolatile memory devices 1231 to 123$n$, based on the parity data. If a detected error is within a correctable range, the ECC unit 1214 may correct the detected error.

The memory interface unit 1215 may provide control signals such as commands and addresses to at least one of the nonvolatile memory devices 1231 to 123$n$, according to control of the control unit 1212. Moreover, the memory interface unit 1215 may exchange data with at least one of the nonvolatile memory devices 1231 to 123$n$, according to control of the control unit 1212. For example, the memory interface unit 1215 may provide the data stored in the buffer memory device 1220, to at least one of the nonvolatile memory devices 1231 to 123$n$, or provide the data read from at least one of the nonvolatile memory devices 1231 to 123$n$, to the buffer memory device 1220.

The memory interface unit 1215 may include the memory interface unit 113 shown in FIG. 1.

The buffer memory device 1220 may temporarily store data to be stored in at least one of the nonvolatile memory devices 1231 to 123*n*. Further, the buffer memory device 1220 may temporarily store the data read from at least one of the nonvolatile memory devices 1231 to 123*n*. The data temporarily stored in the buffer memory device 1220 may be transmitted to the host device 1100 or at least one of the nonvolatile memory devices 1231 to 123*n* according to control of the controller 1210.

The nonvolatile memory devices 1231 to 123*n* may be used as storage media of the SSD 1200. The nonvolatile memory devices 1231 to 123*n* may be coupled with the controller 1210 through a plurality of channels CH1 to CHn, respectively. One or more nonvolatile memory devices may be coupled to one channel. The nonvolatile memory devices coupled to each channel may be coupled to the same signal bus and data bus. The nonvolatile memory devices coupled to a single channel may be configured in the same manner as the memory devices D1 to D4 shown in FIG. 1. Each of the nonvolatile memory devices 1231 to 123*n* may include a main region and a buffer region shown in FIG. 1.

The power supply 1240 may provide power PWR inputted through the power connector 1260, to the inside of the SSD 1200. The power supply 1240 may include an auxiliary power supply 1241. The auxiliary power supply 1241 may supply power to allow the SSD 1200 to be normally terminated when a sudden power-off occurs. The auxiliary power supply 1241 may include large capacity capacitors.

The signal connector 1250 may be configured by various types of connectors depending on an interface scheme between the host device 1100 and the SSD 1200.

The power connector 1260 may be configured by various types of connectors depending on a power supply scheme of the host device 1100.

Figure 7:
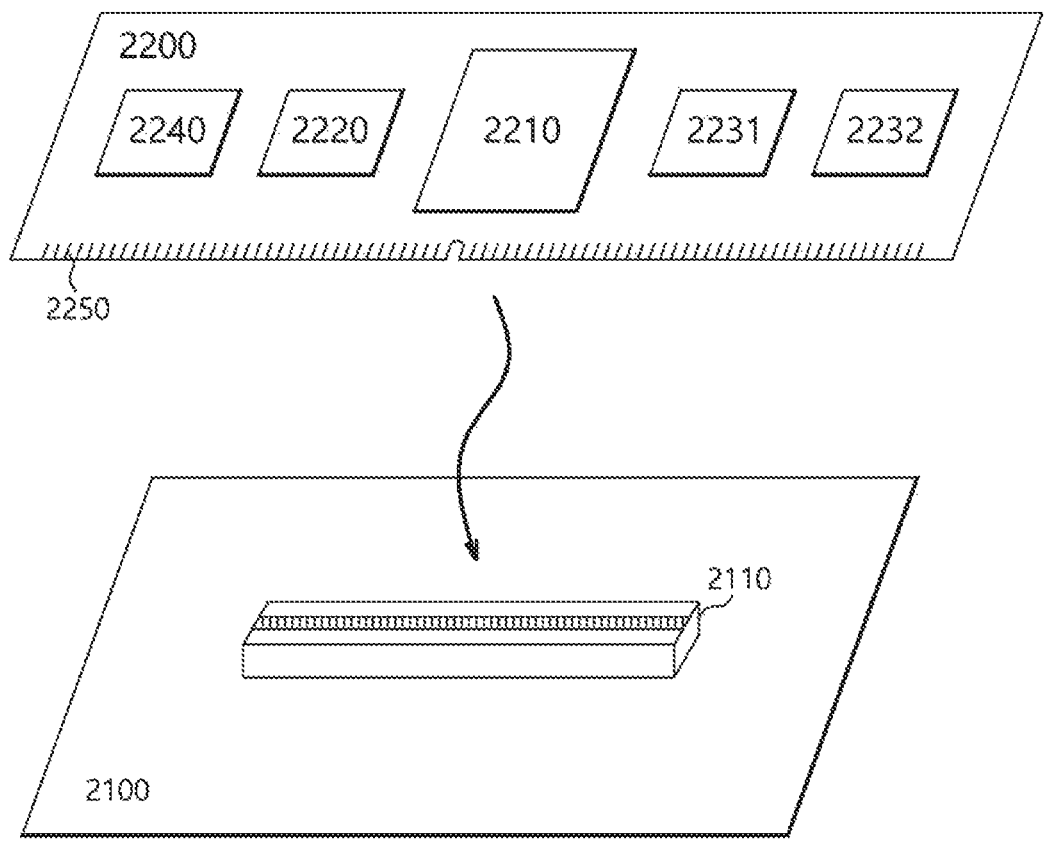
FIG. 7 is a diagram illustrating a data processing system including a memory system in accordance with an embodiment.

FIG. 7 is a diagram illustrating a data processing system 2000 including a memory system 2200 in accordance with an embodiment. Referring to FIG. 7, the data processing system 2000 may include a host device 2100 and the memory system 2200.

The host device 2100 may be configured in the form of a board such as a printed circuit board. Although not shown, the host device 2100 may include internal function blocks for performing the function of a host device.

The host device 2100 may include a connection terminal 2110 such as a socket, a slot or a connector. The memory system 2200 may be mounted to the connection terminal 2110.

The memory system 2200 may be configured in the form of a board such as a printed circuit board. The memory system 2200 may be referred to as a memory module or a memory card. The memory system 2200 may include a controller 2210, a buffer memory device 2220, nonvolatile memory devices 2231 and 2232, a power management integrated circuit (PMIC) 2240, and a connection terminal 2250.

The controller 2210 may control general operations of the memory system 2200. The controller 2210 may be configured in the same manner as the controller 1210 shown in FIG. 6.

The buffer memory device 2220 may temporarily store data to be stored in the nonvolatile memory devices 2231 and 2232. Further, the buffer memory device 2220 may temporarily store the data read from the nonvolatile memory devices 2231 and 2232. The data temporarily stored in the buffer memory device 2220 may be transmitted to the host device 2100 or the nonvolatile memory devices 2231 and 2232 according to control of the controller 2210.

The nonvolatile memory devices 2231 and 2232 may be used as storage media of the memory system 2200.

The PMIC 2240 may provide the power inputted through the connection terminal 2250, to the inside of the memory system 2200. The PMIC 2240 may manage the power of the memory system 2200 according to control of the controller 2210.

The connection terminal 2250 may be coupled to the connection terminal 2110 of the host device 2100. Through the connection terminal 2250, signals such as commands, addresses, data and so forth and power may be transferred between the host device 2100 and the memory system 2200. The connection terminal 2250 may be configured into various types depending on an interface scheme between the host device 2100 and the memory system 2200. The connection terminal 2250 may be disposed on any one side of the memory system 2200.

Figure 8:
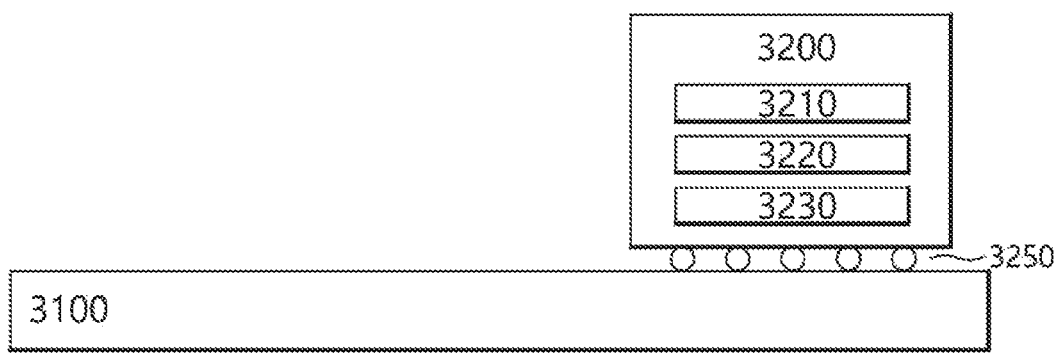
FIG. 8 is a diagram illustrating a data processing system including a memory system in accordance with an embodiment.

FIG. 8 is a diagram illustrating a data processing system 3000 including a memory system 3200 in accordance with an embodiment. Referring to FIG. 8, the data processing system 3000 may include a host device 3100 and the memory system 3200.

The host device 3100 may be configured in the form of a board such as a printed circuit board. Although not shown, the host device 3100 may include internal function blocks for performing the function of a host device.

The memory system 3200 may be configured in the form of a surface-mounting type package. The memory system 3200 may be mounted to the host device 3100 through solder balls 3250. The memory system 3200 may include a controller 3210, a buffer memory device 3220, and a nonvolatile memory device 3230.

The controller 3210 may control general operations of the memory system 3200. The controller 3210 may be configured in the same manner as the controller 1210 shown in FIG. 6.

The buffer memory device 3220 may temporarily store data to be stored in the nonvolatile memory device 3230. Further, the buffer memory device 3220 may temporarily store the data read from the nonvolatile memory device 3230. The data temporarily stored in the buffer memory device 3220 may be transmitted to the host device 3100 or the nonvolatile memory device 3230 according to control of the controller 3210.

The nonvolatile memory device 3230 may be used as the storage medium of the memory system 3200.

Figure 9:
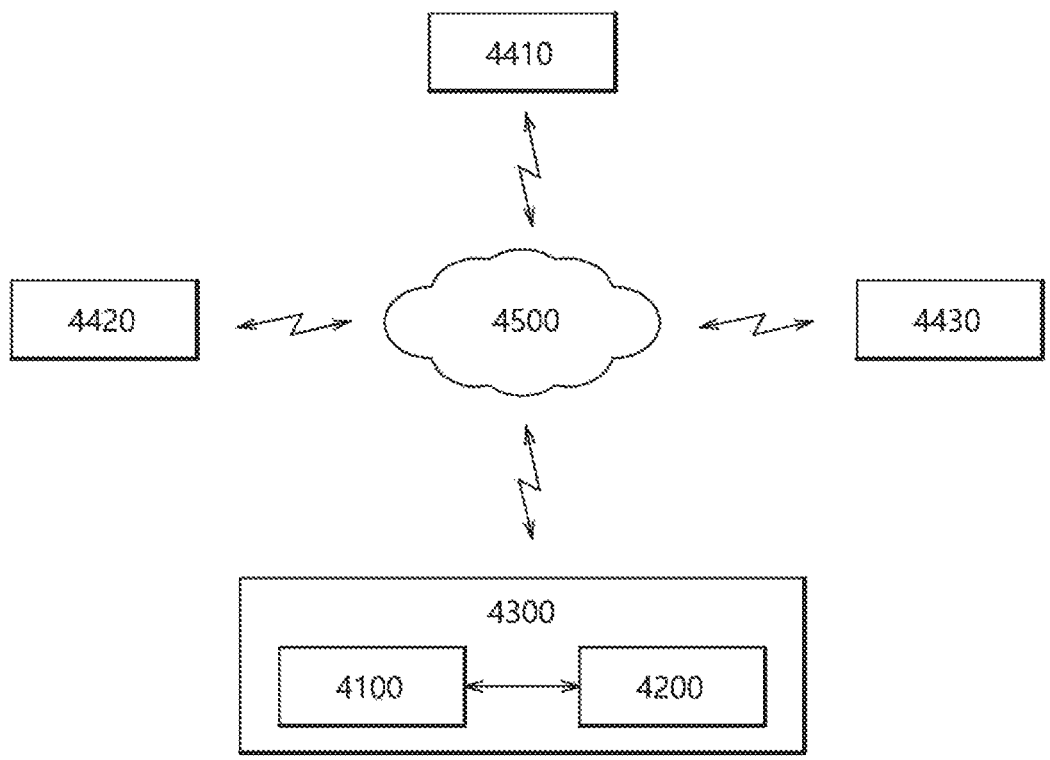
FIG. 9 is a diagram illustrating a network system including a memory system in accordance with an embodiment.

FIG. 9 is a diagram illustrating a network system 4000 including a memory system 4200 in accordance with an embodiment. Referring to FIG. 9, the network system 4000 may include a server system 4300 and a plurality of client systems 4410 to 4430 which are coupled through a network 4500.

The server system 4300 may service data in response to requests from the plurality of client systems 4410 to 4430. For example, the server system 4300 may store the data provided from the plurality of client systems 4410 to 4430. For another example, the server system 4300 may provide data to the plurality of client systems 4410 to 4430.

The server system 4300 may include a host device 4100 and the memory system 4200. The memory system 4200 may be configured by the memory system 100 shown in FIG. 1, the memory system 1200 shown in FIG. 6, the memory system 2200 shown in FIG. 7 or the memory system 3200 shown in FIG. 8.

Figure 10:
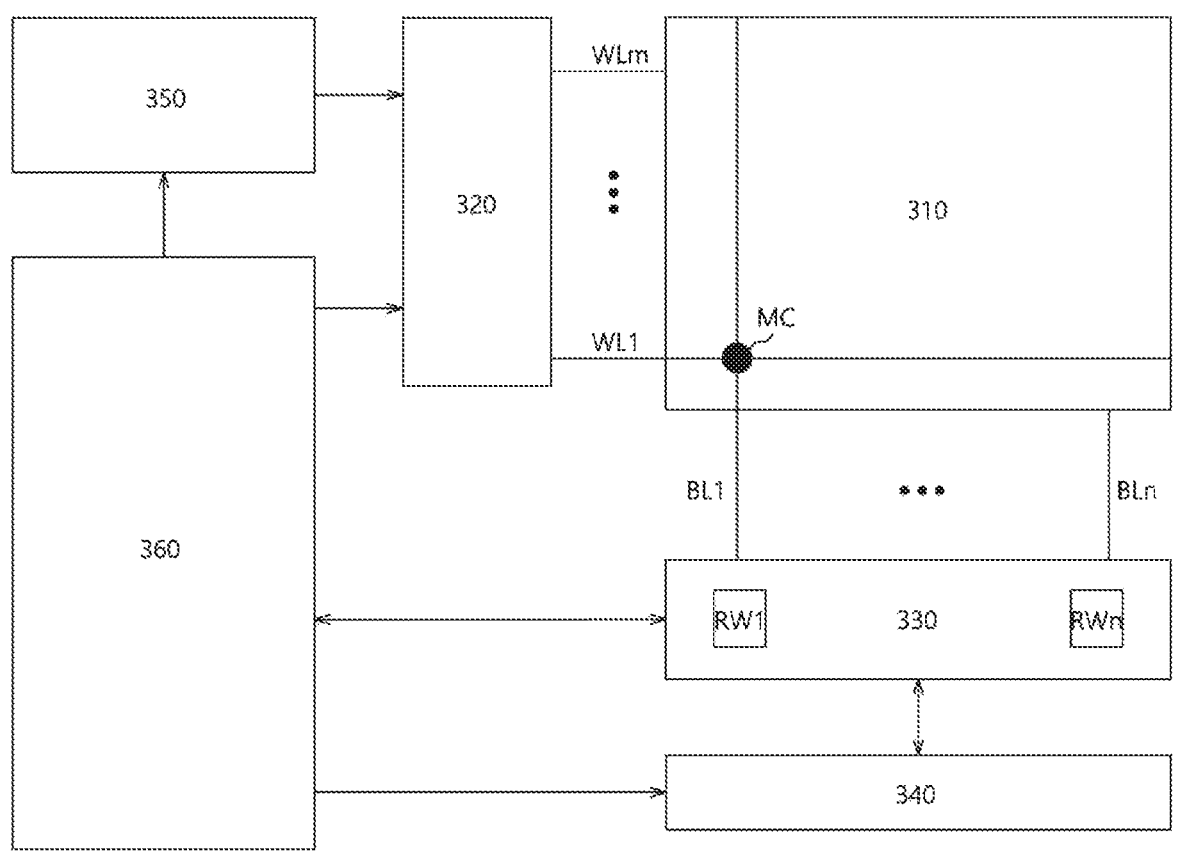
FIG. 10 is a block diagram illustrating a nonvolatile memory device included in a memory system in accordance with an embodiment.

FIG. 10 is a block diagram illustrating a nonvolatile memory device 300 included in a memory system in accordance with an embodiment. Referring to FIG. 10, the nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines BL1 to BLn intersect with each other.

The row decoder 320 may be coupled with the memory cell array 310 through the word lines WL1 to WLm. The row decoder 320 may operate according to control of the control logic 360. The row decoder 320 may decode an address provided from an external device (not shown). The row decoder 320 may select and drive the word lines WL1 to WLm, based on a decoding result. For instance, the row decoder 320 may provide a word line voltage provided from the voltage generator 350, to the word lines WL1 to WLm.

The data read/write block 330 may be coupled with the memory cell array 310 through the bit lines BL1 to BLn. The data read/write block 330 may include read/write circuits RW1 to RWn respectively corresponding to the bit lines BL1 to BLn. The data read/write block 330 may operate according to control of the control logic 360. The data read/write block 330 may operate as a write driver or a sense amplifier according to an operation mode. For example, the data read/write block 330 may operate as a write driver which stores data provided from the external device, in the memory cell array 310 in a write operation. For another example, the data read/write block 330 may operate as a sense amplifier which reads out data from the memory cell array 310 in a read operation.

The column decoder 340 may operate according to control of the control logic 360. The column decoder 340 may decode an address provided from the external device. The column decoder 340 may couple the read/write circuits RW1 to RWn of the data read/write block 330 respectively corresponding to the bit lines BL1 to BLn with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided from the external device. For example, the control logic 360 may control operations of the nonvolatile memory device 300 such as read, write and erase operations of the nonvolatile memory device 300.

While various embodiments have been described above, it will be understood to those skilled in the art that the embodiments described are examples only. Accordingly, the memory system and the operating method thereof described herein should not be limited to the described embodiments. It will be apparent to those skilled in the art to which the present invention pertains that various other changes and modifications may be made without departing from the spirit and scope of the invention as defined in the following claims.

What is claimed is:

1. An operating method of a memory system comprising:
   transmitting, by a descriptor generator, cache descriptors to a memory interface unit, and suspending the ordered cache output descriptors by ordering cache output descriptors in a response order;
   generating, by the memory interface unit, cache commands based on the cache descriptors, and transmitting the cache commands to memory devices;
   transmitting, by the descriptor generator, the cache output descriptors to the memory interface unit by transmitting a suspension-released cache output descriptor to the memory interface unit when the suspension-released cache output descriptor corresponds to a turn at which the suspension-released cache output descriptor is to be transmitted to the memory interface unit according to the response order; and
   generating, by the memory interface unit, cache output commands based on the cache output descriptors, and transmitting the cache output commands to the memory devices.

2. The operating method according to claim 1, wherein the suspending of the cache output descriptors comprises storing, by the descriptor generator, the cache output descriptors in a FIFO queue according to the response order.

3. The operating method according to claim 1, further comprising generating, by the descriptor generator, the cache descriptors and the cache output descriptors in response to read requests transmitted from a host device,
   wherein a single read request corresponds to a single cache descriptor and a single cache output descriptor.

4. The operating method according to claim 3, wherein the response order comprises an order assigned to the read requests.

5. The operating method according to claim 1, wherein the transmitting of the cache output commands to the memory devices comprises transmitting, by the memory interface unit, each of the cache output commands depending on a state of a corresponding memory device.

6. The operating method according to claim 1, further comprising sequentially receiving, by the memory interface unit, data outputted from the memory devices by the cache output commands through data lines shared by the memory devices.

7. The operating method according to claim 6, further comprising transmitting, by a host interface unit, the data to a host device according to the response order.

8. The operating method according to claim 1, further comprising caching, by each of the memory devices, data stored in a main region into a buffer region in response the cache command.

9. A memory system comprising:
   a plurality of memory devices;
   a descriptor generator configured to generate cache descriptors and cache output descriptors, and suspend the ordered cache output descriptors by ordering the cache output descriptors in a response order; and
   a memory interface unit configured to generate cache commands based on the cache descriptors, and transmit the cache commands to the memory devices,
   wherein the descriptor generator transmits the cache output descriptors to the memory interface unit by transmitting a suspension-released cache output descriptor to the memory interface unit when the suspension-released cache output descriptor corresponds to a turn at which the suspension-released cache output descriptor is to be transmitted to the memory interface unit according to the response order, and the memory interface unit generates cache output commands based on the cache output descriptors, and transmits the cache output commands to the memory devices.

10. The memory system according to claim 9, wherein the descriptor generator stores the cache output descriptors in a FIFO queue according to the response order.

11. The memory system according to claim 9, wherein the descriptor generator generates the cache descriptors and the cache output descriptors in response to read requests transmitted from a host device, and a single read request corresponds to a single cache descriptor and a single cache output descriptor.

12. The memory system according to claim 11, wherein the response order comprises an order assigned to the read requests.

13. The memory system according to claim 9, wherein the memory interface unit transmits each of the cache output commands depending on a state of a corresponding memory device.

14. The memory system according to claim 9, wherein the memory interface unit sequentially receives data outputted from the memory devices by the cache output commands through data lines shared by the memory devices.

15. The memory system according to claim 14, further comprising a host interface unit configured to transmit the data to a host device according to the response order.

16. The memory system according to claim 9, wherein each of the memory devices comprises a main region and a buffer region, and caches data stored in the main region into the buffer region in response to the cache command.

17. A memory system comprising:

a plurality of memory devices each including a memory region and a buffer region; and a controller suitable for controlling, in response to an external request, each of the memory devices to perform operations of buffering into the buffer region data read from the memory region, wherein the controller controls the memory devices to provide thereto the buffered data according to an order defined in the external request by:

generating and suspending cache output descriptors according to the order; and generating and providing to the memory devices cache output commands based on the suspend cache output descriptors by generating and providing to a corresponding memory device a cache output command based on a suspension-released cache output descriptor when the suspension-released cache output descriptor corresponds to a turn at which the suspension-released cache output descriptor is to be processed according to the order.

* * * * *